United States Patent
Finlayson et al.

(10) Patent No.: US 10,789,692 B2
(45) Date of Patent: Sep. 29, 2020

(54) METHOD AND SYSTEM FOR GENERATING AN OUTPUT IMAGE FROM A PLURALITY OF CORRESPONDING INPUT IMAGE CHANNELS

(71) Applicant: Apple Inc., Cupertino, CA (US)

(72) Inventors: Graham Finlayson, Norwich (GB); Alex Hayes, Norwich (GB)

(73) Assignee: Apple Inc., Cupertino, CA (US)

(*) Notice: Subject to any disclaimer, the term of this patent is extended or adjusted under 35 U.S.C. 154(b) by 56 days.

(21) Appl. No.: 15/779,219

(22) PCT Filed: Nov. 28, 2016

(86) PCT No.: PCT/GB2016/053728
§ 371 (c)(1),
(2) Date: May 25, 2018

(87) PCT Pub. No.: WO2017/089832
PCT Pub. Date: Jun. 1, 2017

(65) Prior Publication Data
US 2018/0350050 A1 Dec. 6, 2018

(30) Foreign Application Priority Data
Nov. 27, 2015 (GB) .................................. 1520932.3

(51) Int. Cl.
| | | |
|---|---|---|
| G06T 5/50 | (2006.01) | |
| G06T 7/13 | (2017.01) | |
| G06T 3/00 | (2006.01) | |
| G06T 3/20 | (2006.01) | |
| G06T 5/00 | (2006.01) | |
| H04N 9/31 | (2006.01) | |

(52) U.S. Cl.
CPC .............. *G06T 5/50* (2013.01); *G06T 3/0012* (2013.01); *G06T 3/20* (2013.01); *G06T 5/002* (2013.01); *G06T 7/13* (2017.01); *H04N 9/3179* (2013.01); *G06T 2207/10036* (2013.01); *G06T 2207/10048* (2013.01); *G06T 2207/20028* (2013.01); *G06T 2207/20192* (2013.01); *G06T 2207/20221* (2013.01)

(58) Field of Classification Search
CPC combination set(s) only.
See application file for complete search history.

(56) References Cited

U.S. PATENT DOCUMENTS 6,539,126 B1 * 3/2003 Socolinsky ............... G06T 5/20
345/617
8,611,602 B2 * 12/2013 Jin ........................ G06T 7/246
382/103

(Continued)

*Primary Examiner* — Tsung Yin Tsai
(74) *Attorney, Agent, or Firm* — Blank Rome LLP

(57) ABSTRACT

A method and system for generating an output image from a plurality, N, of corresponding input image channels is described. A Jacobian matrix of the plurality of corresponding input image channels is determined. The principal characteristic vector of the outer product of the Jacobian matrix is calculated. The sign associated with the principal characteristic vector is set whereby an input image channel pixel projected by the principal characteristic vector results in a positive scalar value. The output image as a per-pixel projection of the input channels in the direction of the principal characteristic vector is generated.

20 Claims, 4 Drawing Sheets

(56) References Cited

U.S. PATENT DOCUMENTS

| | | | | |
|---|---|---|---|---|
| 2005/0069207 A1* | 3/2005 | Zakrzewski | ........... | G06K 9/629 |
| | | | | 382/190 |
| 2006/0257027 A1* | 11/2006 | Hero | ....................... | G06K 9/627 |
| | | | | 382/190 |
| 2013/0064451 A1* | 3/2013 | Senda | ........................ | G06T 7/30 |
| | | | | 382/190 |
| 2015/0125061 A1* | 5/2015 | Holt | ........................ | G06T 5/001 |
| | | | | 382/132 |

\* cited by examiner

METHOD AND SYSTEM FOR GENERATING AN OUTPUT IMAGE FROM A PLURALITY OF CORRESPONDING INPUT IMAGE CHANNELS

CROSS-REFERENCE TO RELATED APPLICATIONS

This application is a U.S. National Stage Application under 35 U.S.C. § 371 of International Patent Application No. PCT/GB2016/053728, filed Nov. 28, 2016 which claims priority to Great Britain Application No. 1520932.3, filed Nov. 27, 2015, which are hereby incorporated by reference in their respective entireties.

FIELD OF THE INVENTION

The present invention relates to a method and system for generating an output image from multi-channel image data such as image data for multiple spectra and/or multiple sensors.

BACKGROUND TO THE INVENTION

There are many applications where multiple images or image channels are fused to form a single summary greyscale or colour output. These include computational photography (e.g. RGB-NIR), multispectral photography, diffusion tensor imaging (medical), and remote sensing.

A multitude of different devices capture images that are then displayed on monitors or other display devices. Ultimately, the majority are interpreted, or simply enjoyed, by human observers. To go from a captured image to a visualised image in some cases is straightforward: images captured with an RGB colour camera need only be colour-corrected in order to display an image that is perceptually close to the original scene. However, the situation is not straightforward when, for example, the images are captured outside the visible electro-magnetic spectrum, or when more than three channels (also known as dimensions) are captured.

In many imaging applications a greater number of channels are captured than can be viewed by human observers. While the human visual system can visualise three colour dimensions, many image capture systems capture significantly more than this: multispectral and hyperspectral imaging systems can capture upwards of 200 colour channels, including images captured in the infra-red and ultra-violet ranges.

One way to visualise the information in a multispectral or hyperspectral image is simply to display the section of the signal contained within the visible spectrum; in other words, display the colour image that replicates what would be seen by a human observer. The problem with this approach is that information from additional modalities, such as infra-red and ultra-violet, would be lost. Or, more generally, two spectrally different but metameric colours would be displayed as being identical.

An alternative approach is to blend the information from all channels together and to make a false-colour image that reflects the information content of the component image. While this approach will preserve some information from all different modalities, the colours assigned to each object may be markedly different from the true colours.

One approach that attempts to retain and convey information from the source in the output image is known as image fusion. In image fusion, image details present in N input images or channels are combined into one output image. Image fusion methods include methods based on wavelet decomposition, the Laplacian pyramid and neural networks.

Image gradients are a natural and versatile way of representing image detail information, and have been used as a basis for several image fusion techniques. A powerful way of summarizing gradient information across N input image channels is called the Di Zenzo structure tensor (defined as the 2×2 inner product of the N×2 image Jacobian). Structure tensor based methods have many applications in computer vision, including in image segmentation and image fusion.

Often, image fusion is carried out in the derivative domain. Here, a new composite fused derivative is found that best accounts for the detail across all images and then the resulting gradient field is reintegrated.

This is the approach taken in U.S. Pat. No. 6,539,126 to Socolinsky and Wolff (referred to hereafter as "SW" and which is herein incorporated by reference in its entirety). It uses the Di Zenzo structure tensor to find a 1-D set of equivalent gradients, which in terms of their orientation and magnitude, approximate the tensor derived from a multi-channel image as closely as possible in a least-squares sense. The Di Zenzo structure tensor (Z), also known as the First Fundamental Form, is defined as the inner product of the Jacobian: $Z=J^T J$.

The equivalent gradient is defined by the most significant eigenvalue and associated eigenvector of the structure tensor. The sign of the derived gradient is also undefined (this is a weakness of the SW method) and must be defined heuristically. Unfortunately, the derived gradient field in this approach is often non-integrable. Integration is attempted in a least-squares sense—a solution is sought for a single channel image $z(x,y)$ whose derivatives are as close as possible to the equivalent gradients. As a result, the reintegration step generally hallucinates new detail (not appearing in any of the input images or image channels) including halos, bending artefacts and large scale false gradients.

Because the gradient field reintegration problem (of non-integrable fields) is inherently ill-posed, derivative domain techniques will always hallucinate detail in the fused image that wasn't present in the original image.

Recent techniques which apply additional constraints to the reintegration problem can sometimes mitigate but not remove these artefacts.

In other approaches, the fused image is post processed so that connected components—defined as regions of the input multispectral image that have the same input vector values—must have the same pixel intensity. Unfortunately, this additional step can produce unnatural contouring and edge effects.

STATEMENT OF INVENTION

According to an aspect of the present invention, there is provided a method for generating an output image from a plurality, N, of corresponding input image channels, the method comprising:
  determining a Jacobian matrix of the plurality of corresponding input image channels;
  calculating the principal characteristic vector of the outer product of the Jacobian matrix;
  setting the sign associated with the principal characteristic vector whereby an input image channel pixel projected by the principal characteristic vector results in a positive scalar value; and, generating the output image as a per-pixel projection of the input channels in the direction of the principal characteristic vector.

The step of calculating preferably further comprises the steps of:

generating a sparse N-vector projector image from said Jacobian matrix, for each element of the Jacobian matrix that is non-zero; and, infilling the sparse N-vector projector image for elements of the Jacobian matrix that are zero.

The infilling may comprise infilling by defining the vector for each zero element to be average of a local neighbourhood. The average may be edge-sensitive. The infilling may comprise bilaterally filtering the sparse N-vector projector image. The bilateral filter preferably comprises a cross bilateral filter. The step of infilling may include smoothing the N-vector projector image. The step of infilling may include interpolating the N-vector projector image. The step of infilling may include performing edge-sensitive diffusion on the N-vector projector image.

The step of filtering may include filtering the each channel of the N-vector projector image independently.

The method may further comprise scaling each vector after infilling to have unit length.

The method may further comprise spreading vectors after infilling to move each vector component a fixed multiple of angular degrees away from the mean.

The method may further comprise the steps of:

performing said determining and calculating step on downsampled input image channels and upsampling the calculated principal characteristic vector for use in the generating step.

Each unique input image vector may directly map to a single projection vector.

The mapping between a unique input image vector and a principal characteristic vector may be implemented as a look-up-table.

The input image may have N channels and the output image has M channels, the principal characteristic vector comprising a per-pixel M×N matrix transform mapping the input image's N×2 Jacobian to a target M×2 output Jacobian.

The method may further comprise the step of per-pixel transforming the input image channels by their respective M×N transform.

The M×N transform may map the N×2 input image Jacobian to a M×2 accented Jacobian counterpart.

The step of calculating may further comprise the step of:

generating a sparse M×N transform image from infilling the sparse N×2 image for elements of the Jacobian matrix that are zero The method may further comprise the steps of:

performing said determining and calculating step on downsampled input image channels and upsampling the calculated M×N transforms for use in the generating step.

Each unique input image vector may directly map to a single M×N transform vector. The mapping between a unique input image vector and M×N transform may be implemented as a look-up-table.

According to another aspect of the present invention, there is provided a system for generating an output image from a plurality, N, of corresponding input image channels, the system comprising:

an input arranged to access the N input image channels;

a processor configured to execute computer program code for executing an image processing module, including:

computer program code configured to determine a Jacobian matrix of the plurality of corresponding input image channels;

computer program code configured to calculate the principal characteristic vector of the outer product of the Jacobian matrix;

computer program code configured to set the sign associated with the principal characteristic vector whereby an input image channel pixel projected by the principal characteristic vector results in a positive scalar value; and, computer program code configured to generate the output image as a per-pixel projection of the input channels in the direction of the principal characteristic vector.

The computer program code to calculate may further comprise the steps of:

computer program code configured to generate a sparse N-vector projector image from said Jacobian matrix, for each element of the Jacobian matrix that is non-zero; and, computer program code configured to infill the sparse N-vector projector image for elements of the Jacobian matrix that are zero.

The computer program code configured to infill may include computer program code configured to smooth the N-vector projector image.

The computer program code configured to infill may include computer program code configured to interpolate the N-vector projector image.

The computer program code configured to infill may include computer program code configured to perform edge-sensitive diffusion on the N-vector projector image.

The filter may be arranged to filter each channel of the N-vector projector image independently.

The processor may be configured to execute computer program code to scale each vector after infilling to have unit length.

The processor may be configured to execute computer program code to spread vectors after infilling to move each vector component a fixed multiple of angular degrees away from the mean.

The processor may be configured to execute computer program code to obtain downsampled input channels, perform said determining and calculating step on the downsampled input image channels and upsample the calculated principal characteristic vector for use in the generating step.

The system may further comprise a look-up-table mapping between a unique input image vector and a principal characteristic vector, the system being arranged to access the look-up-table to determine the principal characteristic vectors for generating the output image.

The input image may have N channels and the output image has M channels, the principal characteristic vector comprising a per-pixel M×N matrix transform mapping the input image's N×2 Jacobian to a target M×2 output Jacobian.

The processor may be further configured to execute computer program code to per-pixel transform the input image channels by their respective M×N transform.

The M×N transform may map the N×2 input image Jacobian to a M×2 accented Jacobian counterpart.

The processor may be configured to execute computer program code to generate a sparse M×N transform image from infilling the sparse N×2 image for elements of the Jacobian matrix that are zero The processor may be further configured to execute computer program code to perform said determining and calculating on downsampled input image channels and to upsample the calculated M×N transforms for use in generating the output image.

Each unique input image vector may directly map to a single M×N transform vector.

The system may further comprise a look-up-table mapping between a unique input image vector and M×N transform, the system being arranged to access the look-up-table to determine the M×N transform for generating the output image.

In embodiments of the present invention, output image data corresponding to an output image is generated from N-channel image data (a channel being a component, layer or channel of an image or a separate image). Unlike in prior methods such as those described above, the embodiments seek to avoid introduction of hallucinated details and other artefacts by avoiding the reintegration step.

In embodiments of the present invention, an output image is generated in which the x and y derivatives generate the same equivalent gradient field as methods such as the SW method described above. In so doing, a fused/combined image that has the derivative structure sought is obtained without reintegration.

Embodiments of the present invention perform a per-pixel projection (linear combination) of the input channels to generate an output image. The output image need not be differentiated but if it were, it would generate equivalent gradients similar to those discussed above. In embodiments of the present invention, the projection direction is the principal characteristic vector of the outer product of the Jacobian. Projection is performed in image space, leading to an output scalar image, rather than in prior approaches which operate in the gradient domain and give output gradients that are often impossible to reintegrate without artefacts.

In preferred embodiments for handling images having sparse derivative information are disclosed. In a preferred embodiment, projection coefficients are diffused among similar image regions using a joint bilateral filter before projecting the input image channels to produce an output image. A global projection image can also be found where each unique multichannel input vector maps to a single projection vector. That is, the projection image is a Look-up-Table from the input image In a preferred embodiment, per channel projections may be derived to create RGB colour (or, in general M-channel) output.

BRIEF DESCRIPTION OF THE DRAWINGS

Embodiments of the present invention will now be described, by way of example only, with reference to the accompanying drawings in which.

DETAILED DESCRIPTION

In the following description, $\underline{I}(x,y)$ is used to denote the xth, yth pixel of an n×m vector image. Each pixel has N planes. For example if $\underline{I}(x,y)$ was a colour image that is defined with respect to the red, green and blue (RGB) colour space, the pixel would be an RGB vector: [R G B]. If the image also contained an image plane that was NIR (near-infrared), or a NIR image was associated with the RGB one, then each pixel would be a 4-vector: [R G B NIR].

As will be appreciated, each plane may be a channel of a single image or may be from data of images on the same subject from different sources.

To understand the derivative structure of an image it is differentiated, in x and y directions, in each of the N image planes. This gives N*2 (x and y derivatives for each of the N image planes) and this is summarized in the N×2 Jacobian matrix J:

$$J = \begin{bmatrix} \frac{\delta I_1}{\delta_X} & \frac{\delta I_1}{\delta_Y} \\ \frac{\delta I_2}{\delta_X} & \frac{\delta I_2}{\delta_Y} \\ \vdots & \vdots \\ \frac{\delta I_N}{\delta_X} & \frac{\delta I_N}{\delta_Y} \end{bmatrix} \quad (1)$$

In the SW approach described above, a single equivalent derivative was sought that best approximates all the derivatives in all the image planes:

$$SW(J) = \begin{bmatrix} \frac{\delta_z}{\delta_x} & \frac{\delta_z}{\delta_y} \end{bmatrix} \quad (2)$$

In the SW method the magnitude and orientation of the derived gradient is known but its sign is defined heuristically. In part, the artefacts discussed above that are seen in the SW method are related to the heuristic setting of the sign of the derived gradient. The SW method generally hallucinate new detail (not appearing in any of the input images or image channels) including halos, bending artefacts and large scale false gradients.

Figure 1:
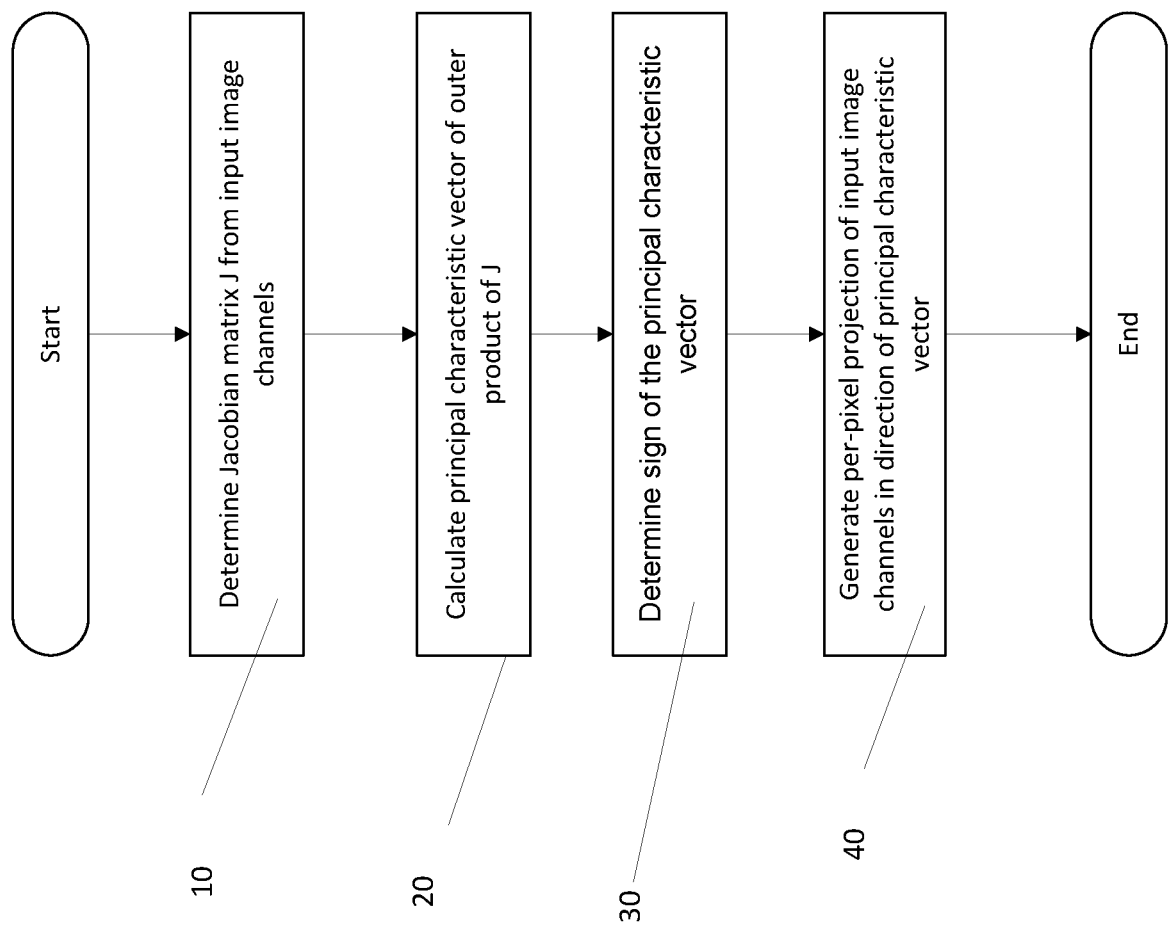
FIG. 1 is a flow diagram of a method for generating an output image from a plurality of corresponding input image channels.

FIG. 1 is a flow diagram of a method for generating an output image from a plurality of corresponding input image channels.

In step 10, a Jacobian matrix (J) is determined for the plurality of corresponding input image channels. An example of such a matrix is set out at (1) above.

In step 20, the principal characteristic vector of the outer product of J is calculated.

In step 30, the sign of the principal characteristic vector is determined. The sign is preferably determined such that an input image channel pixel projected by the characteristic vector should result in a positive scalar value. The sign of the projection vector is set accordingly.

In step 40, an output image is generated as a per-pixel projection of the input channels in the direction of the principal characteristic vector.

It has been identified that the unit length characteristic vector of the column space of J, denoted here as $\underline{v}$, has various useful properties:

i. $\underline{v}^t J$ (multiplication of $\underline{v}$ into J (a 1×N vector multiplied by N×2 Jacobean)) gives a gradient equivalent to that produced by (2) up to an unknown sign (which can be dealt with as discussed below).

ii. Because property (i) is a linear operation and differentiation is also a linear operation, the order of operations can be swapped, that is:

a. $\left[\frac{\delta}{\delta_x}(\underline{v}^t I(x,y))\frac{\delta}{\delta_x}(\underline{v}^t I(x,y))\right] = \underline{v}^t J$ (3)

In the left hand side of (3) we differentiate after we make a new scalar image as the linear combination of the original image where the components of $\underline{v}$ define the weightings of the per channel combination. At a pixel it follows that given $\underline{v}$, an output image derived from N input channels (for example the output image may be a fused image) can be computed directly (as the linear combination of the original image of I(x,y)) and there is no need for reintegration.

iii. Because it is intended for the output image to be displayable, the values of pixels for the output image must be all positive. The import of this is that i. $\underline{v}^t I(x,y) < 0$ then $\underline{v} \leftarrow -\underline{v}$ (4)

One issue with the SW method is that the sign of the equivalent gradient vector is unknown. It has been suggested to set the sign to match the brightness gradient (R+G+G)/3 or optimize the sign to maximise integrability of the desired gradient field. Each method requires further calculation and is not always appropriate. In contrast, unlike the SW method, in embodiments of the present invention the sign of the equivalent derivative vector can be assigned in a well principled way (the left arrow in (4) means assign).

Figure 2:
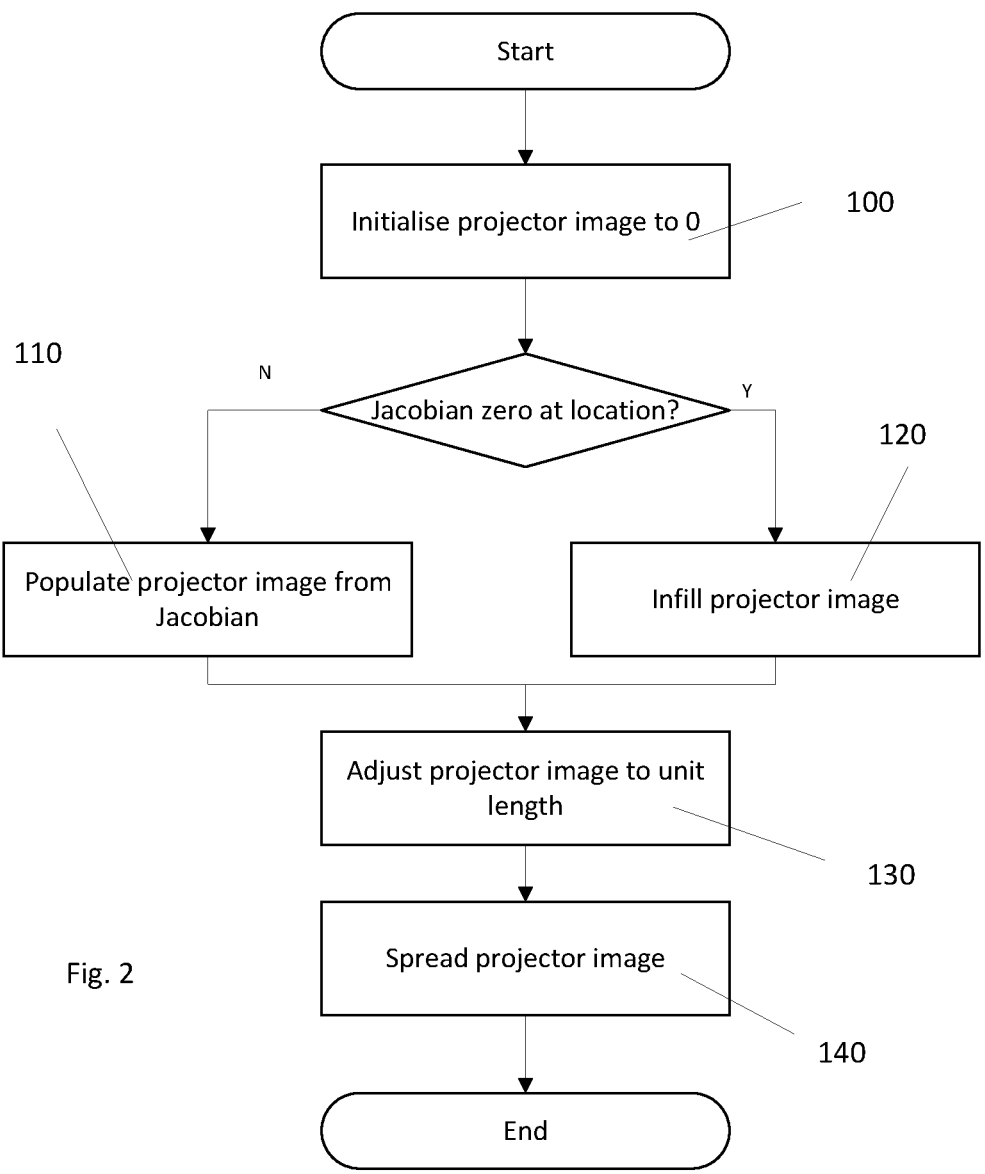
FIG. 2 is a flow diagram of aspects of an example implementation of the method of FIG. 1.

FIG. 2 is a flow diagram of aspects of an example implementation of the method of FIG. 1.

As discussed with reference to FIG. 1 above, a per-pixel projection (linear combination) of input channels I(x) in the direction of the principal characteristic vector $\acute{U}^x$ of the outer product of the Jacobian J produces a sought combined scalar image O(x):

$O(x) = \acute{U}^x \cdot I(x) = \Sigma_{k=1}^N \acute{U}_k^x I_k(x)$ (5)

The Jacobian is discussed above. There are various ways of arriving at the principal characteristic vector $\acute{U}^x$, a preferred embodiment illustrating one way is set out below.

The principal characteristic vector, $\acute{U}^x$, is the first column vector of $U^x$:

$\acute{U}^x = U_1^x$

U in turn is part of the singular value decomposition of the Jacobian, J (the superscript $^x$ denotes the x,y image location):

$J = USV^T$ (6)

U, S and V are N×2, 2×2 and 2×2 matrices, respectively. U and V are othonormal and S is diagonal matrix (whose diagonal components are >=0).

The SW equivalent gradient (up to an unknown sign) is the unit length principal eigenvector of Z scaled by the dominant eigenvalue. This is the first column of SV$^T$. Premultiplying (7) by the transpose of $U^x$ returns the same equivalent gradient as found by the SW method.

In other words, $U^x$ is the product of the Jacobian and the inverse of the square root of the structure tensor, Z, ($Z = VS^2V^T$) from which it follows that the inverse square root of Z is $VS^{-1}$.

The structure tensor is positive and semi-definite and the eigenvalues will therefore be real and positive. In images where underlying channels are continuous and eigenvalues are distinct, the principal characteristic vector of the outer product will also vary continuously and can be calculated from the above.

In images having regions with zero derivatives or where the structure tensor has coincident eigenvalues (e.g. corners) there may be a large change in the projection direction found at one image location compared to another (discontinuity) that may be problematic in determining the principal characteristic vector. FIG. 2 is a flow diagram of a preferred method of processing image channel data to ensure suitability for embodiments of the present invention.

In step 100, a projector image P(x, y) is initialised to zero at every pixel location.

In step 110, P(x, y) is populated based on $\acute{U}^x$ and $S^x$ as follows:

if $\min(S_{11}^x, S_{22}^x) > \theta_1$ and $|S_{11}^x - S_{22}^x| > \theta_2$ then $P(x,y) = \acute{U}^x$ Everywhere assuming the two threshold conditions are met and there is a non-zero Jacobian and the two eigenvalues are sufficiently different (i.e. everywhere the image has non-zero derivatives and we are not at, the rarely occurring, corners) then there is a sparse N-vector projector image $P^S(x,y)$ (the "s" superscript denoting the vector is sparse).

In order to ensure P(x,y)—a final projector image where every spatial location has a well defined projection vector— $P^S(x,y)$ is infilled. Specifically, the N-vector at every (x,y) location is the average of its local neighbourhood where the average is also edge-sensitive. This is done in step 120, where P(x, y) is bilaterally filtered, preferably by applying a simple cross bilateral filter.

$P(x,y) = \text{BilatFilt}(I(x,y), P^S(x,y), \sigma_d, \sigma_r)$ $\theta_1$ and $\theta_2$ are system parameters that may be varied according to implementation. In one embodiment they are set arbitrarily to 0.01 (assuming image values are in [0, 1]).

Preferably, the bilateral filter is a cross bilateral filter with the range term defined by the original image I. The filtering is preferably carried out independently per channel with a Gaussian spatial blur with standard deviation $\sigma_d$ and the standard deviation on the range parameterised by $\sigma_r$. With $\sigma_d = \sigma_{dr} = 0$, no diffusion takes place. As $\sigma_d \to \infty$ and $\sigma_d \to \infty$, the diffusion becomes a global mean, and the projection tends to a global weighted sum of the input channels. If $\sigma_d \to \infty$ and $\sigma_r = 0$ each distinct vector of values in the image will be associated with the same projection vector and so the bilateral filtering step defines subjective mapping which could be implemented as a look-up table.

With the exception of these boundary cases, the standard deviations in the bilateral filter should be chosen to provide the diffusion sought, but should also be selected to ensure the spatial term is sufficiently large to avoid spatial artefacts.

In one embodiment, $\sigma_d$ and $\sigma_r$ are set to min(X; Y)*4 and ((max(I)−min(I))/4)), respectively. In one embodiment, the values are found empirically.

In step 130, P(x, y) is adjusted such that each projection direction is a unit vector.

$$P(x, y) = \frac{P(x, y)}{\|P(x, y)\|}$$

An optional step 140, may also be applied. In this step, a spread function is applied to P(x, y) to improve the projector image. In particular, in one example the spread function moves each of the projection directions a fixed multiple of angular degrees away from the mean (the diffusion step pulls in the opposite direction and results in projection directions closer to the mean compared with those found at step 110).

The exact spread function to be applied will vary from implementation to implementation and also be dependent on the domain in question.

By default, the spread is performed by computing the average angular deviation from the mean before and after the diffusion. Post-diffusion vectors are scaled by a single factor k (k≥1) so that the average angular deviation is the same as prior to the diffusion step. If the spread function creates negative values, the value is clipped to 0. This scaling factor k can be varied according to the requirements of each implementation. For example, in time lapse photography images, k may be 2 to stretch the projector image. In multi-focus applications the value of K may be larger (such as 5 or 8).

In the embodiment of FIG. 2, the projection vectors that are well defined across the image are interpolated or diffused. In preferred embodiments, this is achieved by applying a simple cross bilateral filter, which has been found to provide superior results to a standard Gaussian or median filter, as it uses the image structure contained in the input image channels to guide the diffusion of the projection vectors.

There are other ways of providing an 'in-filled' projection map including anisotropic diffusion, connected component labelling (enforcing the same projection for the same connected component in the input (in analogy to) or enforcing spatial constraints more strongly than in bilateral filtering).

The final projection image can be further constrained so it is a function of the input multichannel image. That is, the projection image can be a look-up-table from the input multichannel image.

After performing steps 100-130 (and optionally 140), the result is N values per pixel defining a projection direction along which the N-vector I(x) is projected to make a scalar output image.

Figure 3:
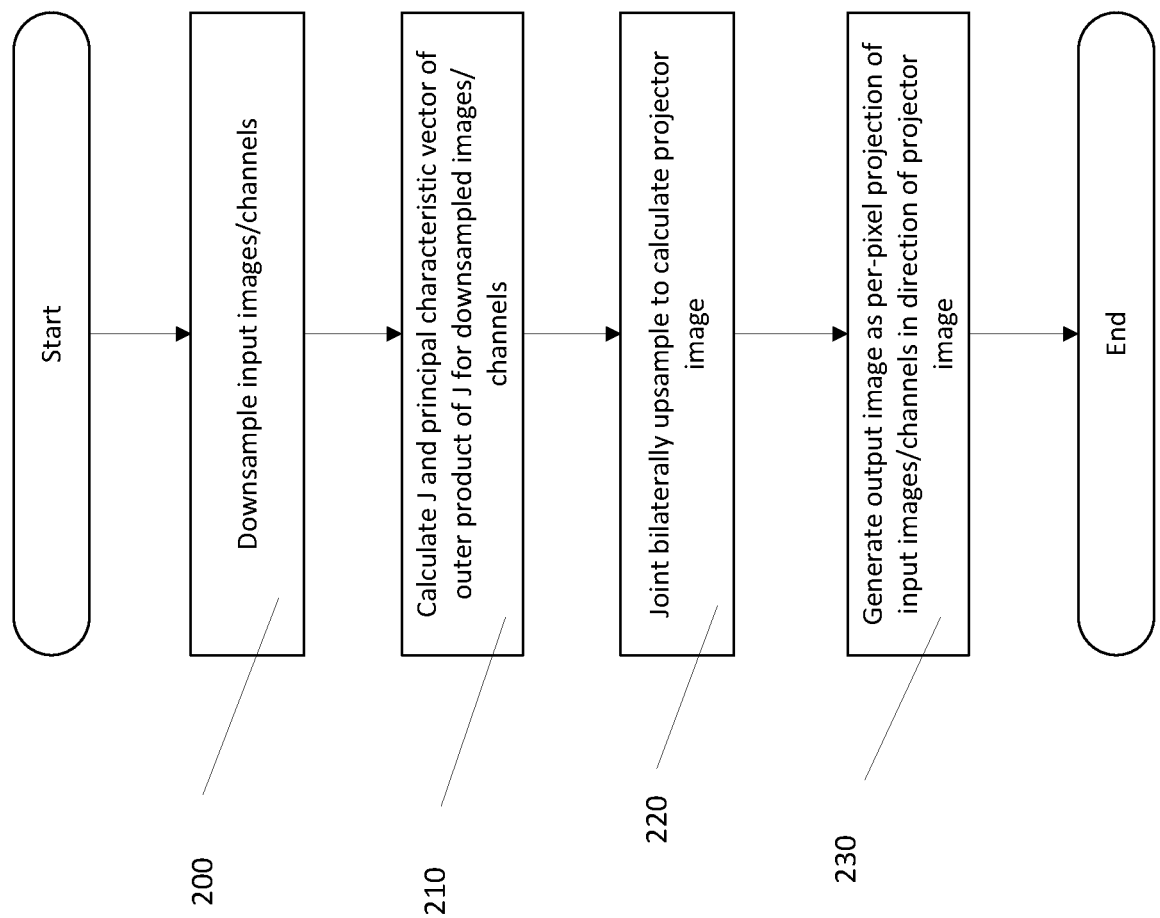
FIG. 3 is a flow diagram of a method according to another embodiment.

FIG. 3 is a flow diagram of a method according to another embodiment.

In this embodiment, the input image(s) are downsampled in step 200 (or alternatively a downsampled version may have been provided or is obtained) and P calculated only for the thumbnail image in step 210 (P may be calculated in the same manner as set out with reference to FIG. 2, for example). Joint bilateral upsampling is then used in step 220 to find the full resolution projector image which is then used in generating as a per-pixel projection of the non-downsampled input channels in step 230.

Again, the final projection map can be a Look-up-table (LUT) of the input multichannel image. The LUT can be calculated on the thumbnail This thumbnail computation also has the advantage that the projector image can be computed in tiles i.e. the method never needs to calculate the full resolution projector image.

In an example RGB-NIR image pair at 682×1024 resolution, fused as separate R, G and B channels for a total of 3 fusion steps, takes 54.93 seconds at full resolution, and 2.82 seconds when calculated on 68×102 downsampled thumbnail images using a MATLAB implementation of an embodiment. This increase in speed does not significantly affect the resulting image—the mean SSIM (structural similarity index) between the full resolution and downsampled results over the corresponding image channels is 0.9991. In general it has been found that an image could be downsampled aggressively to 10K pixel thumbnails (or, even slightly less as in this example) with good results. Though, almost always if downsized to approximately VGA resolution then the results computed on the thumbnails would be close to identical as those computed on the full resolution image.

Figure 4:
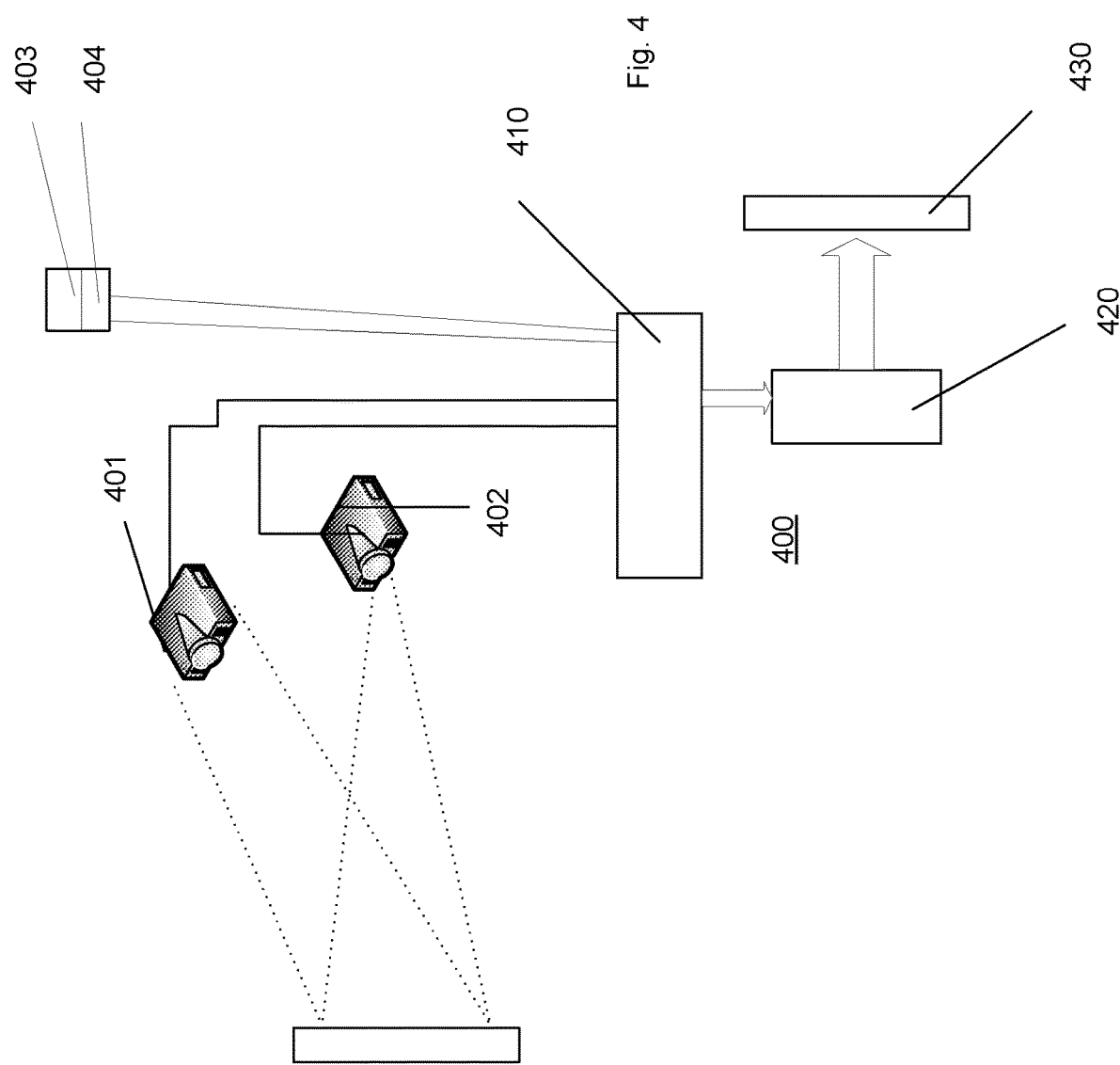
FIG. 4 is schematic diagram of a system for generating an output image from a plurality, N, of corresponding input image channels according to an embodiment of the present invention.

FIG. 4 is schematic diagram of a system 400 for generating an output image from a plurality, N, of corresponding input image channels 401-404. As discussed above, the channels may be separate images, image feeds from cameras, components of a single or related image feeds, components of a single or related image file etc. In the illustrated embodiment, cameras 401 and 402 (for example one may be RGB and one infra-red) and a data source 403/404 are illustrated as providing the image channels. The data source could, for example, be a layered image file from which each layer acts as a separate channel 403, 404. It will be appreciated that many combinations and permutations are possible and the number of different sources of image channels are endless.

The system 400 includes an input 410 arranged to access the N input image channels. This may be an interface or bus to a data feed, a file I/O device or system or some other input.

The system 400 also includes a processor 420 and any necessary memory or other components needed for the system 400 to operate and to execute computer program code for executing an image processing module, including:

computer program code configured to determine a Jacobian matrix of the plurality of corresponding input image channels;

computer program code configured to calculate the principal characteristic vector of the outer product of the Jacobian matrix;

computer program code configured to set the sign associated with the principal characteristic vector whereby an input image channel pixel projected by the principal characteristic vector results in a positive scalar value; and, computer program code configured to generate the output image as a per-pixel projection of the input channels in the direction of the principal characteristic vector.

The output image 430 may be output, for example, via an I/O device or system to memory, a data store, via a network, to a user interface or to an image reproduction device such as a printer or other device for producing a hard-copy. The output image could also serve as an input to other systems.

Extension to the Above Described Method.

Suppose that instead of using the SW method to map the N, x and y derivatives into a single equivalent gradient, some other function $\underline{f}$ is used. The vector function f( ) returns a 1×2 vector, per pixel, x and y estimated derivative. As an example of such a function, the SW method may be modified so that in deriving their equivalent gradient, large per channel derivatives are weighted more than those that are small. At each pixel, the projection vector $\underline{v}$ is found that satisfies:

$$\underline{v}^t J = +- \underline{f}(J) \qquad (7)$$

Equation (7) is underdetermined. There are many $\underline{v}$ that will satisfy this.

However, this can be addressed by determining the minimum norm solution:

$$\underline{v} = J\underline{c} \text{ where } \underline{c}^t = \underline{f}(J)[J^t J]^{-1} \qquad (8)$$

where $\underline{c}$ is a 2-vector. That is, $\underline{v}$ is in the column space of J. Alternatively, a a pixel v could be found that best (in a least squares sense) satisfies $\underline{v}^t J = +- \underline{f}(J)$ at the given pixel and all pixels in an associated neighbourhood.

As with embodiments discussed above, the initial projector vector image is initially sparse and should be processed to define a projection vector everywhere through an edge-sensitive diffusion process.

Here, it is not important that each $\underline{v}(x,y)$ has unit length. Rather, if a given final projector is formed as a weighted combination of the original projectors in the sparse projection image that the sum of the weights is 1.

$$\underline{v}(x, y) = \sum_{i,j} w(i, j)\underline{v}^s(x, y) \text{ then } \underline{v}(x, y) \leftarrow \frac{\underline{v}(x, y)}{\sum_{i,j} w(i, j)} \qquad (9)$$

The right hand side of (10) reads that the final projector image is scaled by the reciprocal of the weights (used in defining the final projector image $\underline{v}(x,y)$).

In WO2011/023969, a copy of which is herein incorporated by reference, an N-component image is fused into an M-component counterpart (where typically M<<N). An example would be to map the 4-channel RGB-NIR image into a 3 dimensional fused colour image.

In the disclosed method and system, an N×2 source Jacobian $J^S$ is transformed to (for the colour case) a 3×2 accented Jacobian $J^A$. Each of the 3 derivative planes in $J^A$ is reintegrated to give the final image. In reintegrating (which are usually non-integrable fields), reintegration artefacts are often produced.

In embodiments of the present invention, per pixel the 3×N linear transform T could be solved such that:

$$TJ^S = J^A \qquad (10)$$

Again because of the linearity of differentiation the fused 3-dimensional image at a given pixel can be computed as T $\underline{I}(x,y)$ since if we differentiate this transformed 3 channel image we precisely calculate $J^A$. As above, there are many Ts that satisfy (11). A least-norm solution can be used to define T uniquely. Or, T can be found in a least-squares sense by finding a single T that best satisfies a given pixel location and that of its neighbourhood.

It follows then that in image regions where there are non-zero Jacobians $J^S$, $J^A$ and $T^S(x,y)$ can be calculated (as before the superscript Ts draws attention to the fact that the transform image is initially sparse). This arrives at a final, non-sparse, T(x,y) (at each location we have a 3×N transform T) by diffusing the initially sparse set of transforms. Applying an analogous diffusion process as described in the last section, the final output fused image is equal to T(x,y) $\underline{I}(x,y)$.

Again the T(x,y) can be a function of the input image (each multichannel input maps to a single transform and this mapping can be implemented as a Look-up-table).

Various experiments have been performed to compare the above described method other algorithms, the image fusion method of Eynard et al., based on using a graph Laplacian to find an M to N channel color mapping, and the Spectral Edge (SE) method of Connah et al., which is based on the structure tensor together with look-up-table based gradient reintegration. The results are set out in the draft paper annexed hereto as Annex 1 and incorporated herein by reference. The paper was published in ICCV '15 Proceedings of the 2015 IEEE International Conference on Computer Vision (ICCV), Dec. 7-13, 2015, pages 334-342 and is incorporated herein by reference.

A comparison of embodiments of the present invention with antecedent methods is shown in Annex 1 FIG. 1, where there are two uniform white images with respectively the top left and bottom left quarters removed. The discrete wavelet transform (DWT) images were produced using a wavelet-based method which merges the coefficients of the two images at different scales. We ran a standard DWT image fusion implementation using the CM (choose maximum) selection method, which is simple and one of the best performing in a comparison.

The input images are small so there is only a 7 level wavelet decomposition. In 1c and 1d the outputs using Daubechies 4 and Biorthogonal 1.3 wavelets are shown. Clearly neither the basic wavelet method nor the SW method (1e) work on this image fusion example. However the result of an embodiment of the present invention (1f) has fusing of the images without artefact. The intensity profile of the green line in 1f, shown in 1h has the desired equiluminant white values, whereas the SW intensity profile 1g shows substantial hallucinated intensity variation.

In Annex 1, FIG. 2 there is shown the colour to greyscale image fusion example of an Ishihara plate used to test colour blindness. In Annex 1 FIG. 2f there is shown the output of the SW method. The SW method fails here because the image is composed of circles of colour on a white background. Because all edges are isolated in this way, the equivalent gradient field exactly characterizes the colour gradients and is integrable and the output in Annex 1 FIG. 2f does not have integration artefacts. Yet, the fused images does not capture the actual look and feel of the input. In contrast, the image produced by an embodiment of the present invention in FIG. 2e (intermediate steps are shown in Annex 1 FIGS. 2b-2d) shows that the initial projection directions are diffused with the bilateral filtering step enforcing the projection directions calculated at a pixel to be considered in concert with other image regions.

The resultant greyscale output can be used, for example, for image optimization for color-deficient viewers. The image in Annex 1 FIG. 2e may be used as a luminance channel replacement in LUV color space for the Protanope simulation image, mapping color variation in the original RGB image Annex 1 FIG. 3a that is invisible to color-deficient observers, to luminance channel detail which they can perceive. In this particular embodiment, a downsampling ratio of 0.5 is used with a k stretching parameter of 2. The result of a system suggested by Eynard et al, is also presented as a comparison—both methods achieve the desired result, although the result of Eynard et al. produces a higher level of discrimination, as their fusion changes the output colour values, whereas the output image produced by embodiments of the present invention only affect luminance.

The quality of the resultant greyscale output from an RGB image can be measured by various metrics. The metric of Kuhn et al. compares the colour distances between pixels in the original RGB image with the greyscale distances between pixels in the output greyscale image. Annex 1, Table 1 shows a comparison of the results of this metric when applied to the RGB images from the Cadik data set, and the CIE L luminance channel, the result of Eynard et al., and the results of the embodiments of the present invention. It will be appreciated that the results of embodiments of the present invention are superior in many cases.

Images captured for remote sensing applications normally span the visible and infrared wavelength spectrum. Taking data from Landsat 5's Thematic Mapper (TM), an example can be seen in Annex 1 FIG. 6. There are 7 captured image channels (3 in the visible spectrum and 4 infrared images). The three visible images are captured from 0.45-0.51 μm (blue), 0.52-0.60 μm (green), and 0.63-0.69 μm (red), which were used as the B, G and R channels respectively of the input RGB image. In Annex 1 FIG. 6a, an input RGB image is shown from the Landsat image set, and in Annex 1 FIGS. 6b and 6c the infrared bands 5 and 7 which include extra detail not present in the RGB bands. All 4 infrared channels are used in the fusion, but only 2 are shown here for reasons of space. The 4 infrared channels are fused with the R, G and B channels in turn using the SW method in Annex 1 FIG. 6d and using an embodiment of the present invention in Annex 1 FIG. 6f, and then the output RGB channels have high and low quantiles matched to the input RGB channels. In Annex 1 FIG. 6e there is shown the result of the Spectral Edge method, which directly fuses the RGB image and all 7 multiband images.

For this application a downsampling ratio of 0.5 and a k stretching parameter of 2 were used. The resultant image was significantly more detailed than the SW method.

In Annex 1 FIG. 3, a conventional RGB image (3a) is fused with an near-infrared (NIR) image (3b). Processing according to an embodiment of the present invention is applied 3 times—fusing the R-channel with the NIR, the G-channel with the NIR and the B-channel with the MR. Post-processing is then performed in which the images are stretched so that their 0.05 and 0.95 quantiles are the same as the original RGB image. The resultant image is shown in Annex 1 FIG. 3e. For comparison there is shown the Spectral Edge output, Annex 1 FIG. 3c and the Eynard et al. output Annex 1 3d. In the same image order there is shown a magnified detail inset in Annex 1 3f. The output image of the POP method captures more MR detail than the SE result, while producing more natural colors than the result of Eynard et al., which has a green color cast and a lack of color contrast. The POP result shows good color contrast, naturalness and detail. For this application a downsampling ratio of 0.1 and a k stretching parameter of 1 is used.

Multifocus image fusion is another potential application, which has typically been studied using greyscale images with different focal settings. Standard multifocus image fusion involves fusing two greyscale input images with different focal settings. In each input image approximately half the image is in focus, so by combining them an image in focus at every point can be produced.

Annex 1, Table 2 shows a comparison of the performance of embodiments of the present invention (the POP image fusion method) on this task, on several standard multifocus image pairs, using standard image fusion quality metrics. The $Q_{XY/F}$ metric is based on gradient similarity, the Q(X; Y; F) metric is based on the structural similarity image measure (SSIM), and the $M_F^{XY}$ metric is based on mutual information. The results are compared to the various comparable methods—the resultant image produced by embodiments of the present invention comes out ahead in the majority of cases.

Plenoptic photography provides various refocusing options of color images, allowing images with different depths of focus to be created from a single exposure. Embodiments of the present invention can be used to fuse these differently focused images into a single image wholly in focus, Implementations can be fine tuned for this application, due to the knowledge that only one of the images is in focus at each pixel. In one example a large k scaling term in the spread function is applied, and a downsampling ratio of 0.5 is used. This allows a crystal clear output image, in focus at every pixel, to be created.

Annex 1 FIG. 7 shows an image in which four different refocused images are created from a single exposure. Using an embodiment of the present invention, the differently focused images are fused into a single image in focus at every point—in comparison the result of the method of Eynard et al. does not show perfect detail in all parts of the image, and has unnatural color information.

Time-lapse photography involves capturing images of the same scene at different times. These can be fused using embodiments of the present invention in the case of greyscale images. For RGB images the stacks of R, G and B channels can be fused separately. This fusion result creates an output image which combines the most salient details of all the time-lapse images. For this application a downsampling ratio of 0.5 and a k stretching parameter of 2 is used. Annex 1, FIG. 8 shows a series of time-lapse images (from Eynard et al.) from different parts of the day and night, and results of POP fusion and the method of Eynard et al. The details only visible with artificial lighting at night are combined with details only visible in the daytime in both results, but the results from embodiments of the present invention produce far more natural colors.

It is to be appreciated that certain embodiments of the invention as discussed below may be incorporated as code (e.g., a software algorithm or program) residing in firmware and/or on computer useable medium having control logic for enabling execution on a computer system having a computer processor. Such a computer system typically includes memory storage configured to provide output from execution of the code which configures a processor in accordance with the execution. The code can be arranged as firmware or software, and can be organized as a set of modules such as discrete code modules, function calls, procedure calls or objects in an object-oriented programming environment. If implemented using modules, the code can comprise a single module or a plurality of modules that operate in cooperation with one another.

Optional embodiments of the invention can be understood as including the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although illustrated embodiments of the present invention have been described, it should be understood that various changes, substitutions, and alterations can be made by one of ordinary skill in the art without departing from the present invention which is defined by the recitations in the claims below and equivalents thereof.

The invention claimed is:

1. A method for generating an output image from a plurality, N, of corresponding input image channels, the method comprising:
   determining a Jacobian matrix of the plurality of corresponding input image channels;
   calculating the principal characteristic vector of the outer product of the Jacobian matrix;
   setting the sign associated with the principal characteristic vector whereby an input image channel pixel projected by the principal characteristic vector results in a positive scalar value; and
   generating the output image in image space as a per-pixel projection of the input channels in the direction of the principal characteristic vector.

2. A system for generating an output image from a plurality, N, of corresponding input image channels, the system comprising:
   an input arranged to access the N input image channels;

a processor configured to execute computer program code for executing an image processing module, including:

computer program code configured to determine a Jacobian matrix of the plurality of corresponding input image channels;

computer program code configured to calculate the principal characteristic vector of the outer product of the Jacobian matrix;

computer program code configured to set the sign associated with the principal characteristic vector whereby an input image channel pixel projected by the principal characteristic vector results in a positive scalar value; and, computer program code configured to generate the output image in image space as a per-pixel projection of the input channels in the direction of the principal characteristic vector.

3. The system of claim 2, computer program code to calculate further comprises the steps of:

computer program code configured to generate a sparse N-vector projector image from said Jacobian matrix, for each element of the Jacobian matrix that is non-zero; and, computer program code configured to infill the sparse N-vector projector image for elements of the Jacobian matrix that are zero.

4. The system of claim 3, wherein the infilling comprises infilling by defining the vector for each zero element to be an average of a local neighborhood.

5. The system of claim 4, wherein the average is edge-sensitive.

6. The system of claim 3, wherein the computer program code configured to infill includes computer program code configured to smooth the N-vector projector image.

7. The system of claim 3, wherein the computer program code configured to infill includes computer program code configured to interpolate the N-vector projector image.

8. The system of claim 3, wherein the computer program code configured to infill includes computer program code configured to perform edge-sensitive diffusion on the N-vector projector image.

9. The system of claim 3, wherein the processor is configured to execute computer program code to scale each vector after infilling to have unit length.

10. The system of claim 3, wherein the processor is configured to execute computer program code to spread vectors after infilling to move each vector component a fixed multiple of angular degrees away from the mean.

11. The system of claim 3, wherein the infilling comprises bilaterally filtering the sparse N-vector projector image.

12. The system of claim 11, wherein the bilateral filter comprises a cross bilateral filter.

13. The system of claim 11, wherein the filter is arranged to filter each channel of the N-vector projector image independently.

14. The system of claim 2, wherein the processor is configured to execute computer program code to obtain downsampled input channels, perform said determining and calculating step on the downsampled input image channels and upsample the calculated principal characteristic vector for use in the generating step.

15. The system of claim 2, further comprising a look-up-table mapping between a unique input image vector and a principal characteristic vector, the system being arranged to access the look-up-table to determine the principal characteristic vectors for generating the output image.

16. The system of claim 2, wherein the input image has N channels and the output image has M channels, the principal characteristic vector comprising a per-pixel M×N matrix transform mapping the input image's N×2 Jacobian to a target M×2 output Jacobian.

17. The system of claim 16, wherein the processor is further configured to execute computer program code to per-pixel transform the input image channels by their respective M×N transform.

18. The system of claim 16, wherein the M×N transform maps the N×2 input image Jacobian to a M×2 accented Jacobian counterpart, and wherein the processor is configured to execute computer program code to generate a sparse M×N transform image from infilling the sparse N×2 image for elements of the Jacobian matrix that are zero.

19. The system of claim 16, wherein the processor is further configured to execute computer program code to perform said determining and calculating on downsampled input image channels and to upsample the calculated M×N transforms for use in generating the output image.

20. The system of claim 16, further comprising a look-up-table mapping between a unique input image vector and M×N transform, the system being arranged to access the look-up-table to determine the M×N transform for generating the output image.

* * * * *